UNITED STATES PATENT OFFICE.

WALTER A. WEST, OF ELKHORN, WISCONSIN.

MILK-COCOA COMPOUND AND PROCESS OF PRODUCING SAME.

1,308,770.     Specification of Letters Patent.     Patented July 8, 1919.

No Drawing.     Application filed March 21, 1919. Serial No. 284,062.

*To all whom it may concern:*

Be it known that I, WALTER A. WEST, a citizen of the United States, residing at Elkhorn, in the county of Walworth and State of Wisconsin, have invented certain new and useful Improvements in Milk-Cocoa Compound and Processes of Producing Same, of which the following is a specification.

The purpose of this invention is to provide a new product of the general character of what is commonly called milk chocolate,—that is, a blend of milk and cocoa, adapted for use in the instantaneous preparation of a hot milk cocoa beverage, adapted also for making cold beverages. It consists in the blend described of the elements named and in the steps of the process of making such blend as indicated in the claims.

It has heretofore been proposed to produce a liquid compound of chocolate or cocoa and milk by mechanically mixing the elements and homogenizing the mixture which is to be then bottled and sterilized in the usual method of sterilizing bottled liquids; but such a compound is not only lacking in the delicate appetizing flavor which is desired and which I have obtained by the present invention, but also it is entirely unsuitable for the instantaneous preparation of the hot beverage because its consistency is substantially that at which it is to be used, and it must therefore be heated and more or less cooked in the heating, with the liability of being spoiled by unskilful handling in the cooking, or in an attempt to cook it without suitable utensils adapted to prevent overcooking or burning. In short, it is not adapted for an instantaneously-produced hot beverage.

The product which constitutes the present invention produced by the process hereinafter described, is distinguished from that which has been heretofore described, as above recited, in that all the elements are thoroughly cooked together and that it is concentrated to a consistency such that the addition to it of three or four times its bulk of hot water produces a beverage of desirable consistency for drinking, the proportion of the compound contained in the resulting beverage being so small in relation to the proportion of hot water that using water near to boiling point or which has just come from the pot in which it has been raised to the boiling point, is cooled only to a suitable temperature for drinking, by the addition of the proper amount of the milk chocolate compound; so that no skill is required to produce instantaneously the beverage desired in its most perfect form, no danger being incurred of overcooking or burning in order to have the beverage at the right hot temperature.

For producing this milk cocoa compound I first reduce milk by evaporation to one-third its bulk, and at that stage without cooling I add commercial cocoa, preferably in powdered form, in the proportion of two and one-half ($2\frac{1}{2}$) ounces of cocoa to each original gallon of milk, and then continue the evaporation and cooking of the two elements together for a short time, and then add to the mixture without cooling it, pure sugar syrup consisting of sixteen pounds of sugar dissolved in two gallons of water, in the proportion of two parts by measure of the reduced cocoa and milk to one part of the sugar syrup mixture. The exposure of the cooked mixture to proper temperature for evaporation is then continued until the whole is concentrated to a semi-liquid or semi-pasty condition, preferably not quite so thick as to be pasty, but in the condition of a very heavy syrup.

This heavy semi-liquid, semi-pasty compound is now passed through a homogenizing apparatus which completes mechanically the blending of the elements, reducing to completely homogeneous condition any portions which have become more or less aggregated in granular or lumpy condition, blending them perfectly with any other portions more liquid than the remainder. The homogenized compound is then canned or bottled, and the compound sterilized by the usual method of sterilizing sealed material,—that is, heating to a sterilizing temperature while the receptacles are under pressure sufficient to balance the interior pressure resulting from heating.

A substantially equivalent method of producing the compound ready for the step of homogenizing consists in cooking together all the elements, viz: raw milk, cocoa or chocolate and sugar mixed in substantially the proportions above indicated, and further evaporating the cooked mixture in a vacuum pan to the desired semi-liquid or semi-pasty consistency. The subsequent steps of homogenizing and sterilizing result in an identical product.

This homogenized sterilized product is a permanent compound or mixture of all the elements having no tendency to separate under any conditions, and will keep for an indefinite time as perfectly as any dry preparations of the elements of which it is composed, except, of course, that there is always a possibility of evaporation from the surface of exposed quantity, tending somewhat to incrusting, but not in any ordinary circumstances for a moderate length of time preventing it from being easily soluble in hot water so as to produce the desired beverage, which is produced by the addition of hot water to the extent of three or four times the volume of the compound.

By the term "homogenized" as employed in the foregoing specification and the following claims, to denote the condition to be produced in the milk cocoa compound described, there is to be understood, that permanent condition of extreme emulsification which is recognizable by an expert in liquid or semi-liquid material which has been forced under extreme pressure, as from one thousand to several thousand pounds per square inch, through the almost infinitesimal crevices which may exist between polished metal plates which are in what would be commonly called air-tight contact. It is well known that organic liquids can be forced by the extreme pressure described through such nearly infinitesimal crevices with the effect of so mechanically breaking down the physical organization, cellular or otherwise, of the different elements, as to bring them into a condition of mechanical union in which they are inseparable, except as the thus unified mixture may be chemically dissolved, yielding not the original mixed organic elements, but only their chemical constituents. This condition of homogenization called for by the claims, is readily distinguishable from ordinary emulsification, such as can be produced by merely forcibly stirring or beating the elements together.

I claim:

1. As a new article of manufacture, a homogenized cooked composition of milk, cocoa and sugar, having a semi-pasty consistency and capable of ready emulsification with water without further treatment.

2. The process of producing a composition of milk, cocoa and sugar which consists in cooking together and then further concentrating by evaporation to a semi-pasty consistency, a mixture of milk, cocoa and sugar; homogenizing the cooked and concentrated mixture, and, finally, sterilizing the homogenized product.

3. The process of producing a milk cocoa product which consists in the following steps: first; concentrating the milk by evaporation to about one-third its natural bulk; second: adding cocoa to the reduced milk without cooling, and cooking the cocoa and milk together; third: adding sugar dissolved in water and further cooking the elements together, and evaporating to a semi-pasty consistency; fourth: homogenizing said semi-pasty composition; fifth: sterilizing the homogenized composition.

In testimony whereof, I have hereunto set my hand at Chicago, Illinois, this 19th day of March, 1919.

WALTER A. WEST.